United States Patent
Lim et al.

(10) Patent No.: US 7,157,691 B2
(45) Date of Patent: Jan. 2, 2007

(54) MONITORING OPTICALLY POWERED ACTUATORS

(75) Inventors: Jirapong Lim, Bangkok (TH); Qingping Yang, Hillingdon (GB); Phillip Richard Jackson, Wimborne (GB); Barry Edward Jones, Henley-on-Thames (GB)

(73) Assignee: Eaton Aerospace Limited, Dorset (GB)

( * ) Notice: Subject to any disclaimer, the term of this patent is extended or adjusted under 35 U.S.C. 154(b) by 307 days.

(21) Appl. No.: 10/362,863

(22) PCT Filed: Aug. 23, 2001

(86) PCT No.: PCT/GB01/03803

§ 371 (c)(1),
(2), (4) Date: Sep. 3, 2003

(87) PCT Pub. No.: WO02/16780

PCT Pub. Date: Feb. 28, 2002

(65) Prior Publication Data

US 2004/0036005 A1   Feb. 26, 2004

(30) Foreign Application Priority Data

Aug. 25, 2000  (GB) ................... 0021075.7

(51) Int. Cl.
*G01J 1/04* (2006.01)
*G01J 1/42* (2006.01)
*G01J 5/08* (2006.01)

(52) U.S. Cl. .............. 250/227.14; 385/8; 356/73.1

(58) Field of Classification Search .......... 250/227.14, 250/227.11, 237 G, 237 R, 205; 385/8–13; 356/35.5, 73.1; 398/81, 84, 87, 142, 147–150
See application file for complete search history.

(56) References Cited

U.S. PATENT DOCUMENTS

| 4,268,116 | A | * | 5/1981 | Schmadel et al. ............. 385/1 |
| 5,584,319 | A | | 12/1996 | Cholin |
| 5,709,245 | A | | 1/1998 | Miller |
| 5,892,860 | A | * | 4/1999 | Maron et al. ................. 385/12 |
| 5,986,749 | A | * | 11/1999 | Wu et al. ................... 356/73.1 |
| 6,056,436 | A | | 5/2000 | Sirkis et al. |
| 6,218,661 | B1 | * | 4/2001 | Schroeder et al. ..... 250/227.14 |
| 6,739,154 | B1 | * | 5/2004 | Davis ........................ 65/378 |

FOREIGN PATENT DOCUMENTS

| EP | 0511787 A1 | 11/1992 |
| EP | 0954743 A1 | 7/1998 |
| EP | 1030472 A2 | 8/2000 |

* cited by examiner

*Primary Examiner*—Seung C. Sohn
(74) *Attorney, Agent, or Firm*—Craig A. Fieschko, Esq.; DeWitt Ross & Stevens S.C.

(57) ABSTRACT

Operation of a power-by-light valve (15) by a source (11) along an optical fibre (13) is monitored by means of optical sensors (14) from which light passes back along fibre (13) to monitoring and processing units (16, 17). The sensors (14) include fibre bragg gratings (41, 43) for detecting differential pressure across diaphragms (42) and for detecting temperature. At the input end, an optical coupler (12) supplies sensor signals to units (16, 17) which can control source (11) via a signal (32).

17 Claims, 5 Drawing Sheets

MONITORING OPTICALLY POWERED ACTUATORS

FIELD OF THE INVENTION

The present invention relates to systems incorporating an optically powered actuator for example within control-by-light and power-by-light valves.

BACKGROUND OF THE INVENTION

Generally, there are three techniques which have been used to convert optical power to operate a valve, which depend on the actuator type.
 1. Convert optical power to electrical power by using a photovoltaic device or photo diode to drive the actuator in the valve, preferably a ferroelectric actuator.
 2. Convert optical power to heat energy; this technique can be used with a valve using a temperature operated actuator such as a bimetallic actuator, thermo-mechanical actuator or shape memory alloy.
 3. Use the optical power to operate the actuator in the valve directly, for example a valve which uses a photosensitive material actuator.

U.S. Pat. No. 5,709,245 discloses an optically controlled actuator employing a laser, an optical fibre and a photocell which energises coils of an electro-hydraulic valve.

SUMMARY OF THE INVENTION

The present invention seeks to provide an optically controlled/powered actuator having a built-in sensing arrangement. The present invention further seeks to provide an arrangement for monitoring the output of the integrated sensor.

According to a first aspect of the present invention there is provided a monitoring system for an optically powered and/or controlled actuator arrangement, comprising an optical path arranged to be connected between at least one optical source and the actuator arrangement for supplying power and/or control information thereto, the actuator arrangement including means for converting the optical power and/or control information characterised in that the actuator arrangement further comprises means for sensing the operation thereof and providing an optical data output back through said optical path, and in that means are connected to the optical path to monitor the output of the sensing means.

In a preferred arrangement, the sensing means is also operated by said optical source.

In a preferred system the sensing means comprises one or more fibre Bragg gratings. The differential pressure of the actuator system may be sensed by an arrangement incorporating a fibre Bragg grating located adjacent to at least one diaphragm. Preferably, the fibre Bragg grating is mounted between two diaphragms arranged to be exposed to different pressures. In addition, or instead, a fibre Bragg grating may be provided for sensing the temperature; this grating may be used to compensate for unwanted temperature effects on the differential pressure grating.

The monitoring system may comprise at least two optical sources, a first of which is used for supplying power and/or control information, and a second of which is used to detect interruption of the optical path and is arranged to turn off the first source in the event of such interruption.

In preferred systems, the output of the sources is controlled by a signal from the monitoring means. The use of such a feedback loop enables control of the actuator.

Preferably, the actuator arrangement is at a location remote from the optical source. Such an arrangement has the advantage that the components at the end of the optical fibre remote from the source can be relatively simple and robust and have no local power requirements.

According to a second aspect of the present invention, there is provided a method of using one or more light sources at a first end of an optical path for powering and/or controlling a valve or actuator at a second end of the optical path characterised in that light from the source(s) is used to interact with one or more sensors, at or adjacent the second end of the optical path, to produce sensing signals, and in that the method further comprises detecting the sensing signals at or adjacent the first end of the optical path.

BRIEF DESCRIPTION OF THE DRAWINGS

Preferred embodiments of the present invention will now be described, by way of example only, with reference to the accompanying drawing, of which.

DETAILED DESCRIPTION OF PREFERRED EMBODIMENTS OF THE INVENTION

Figure 1:
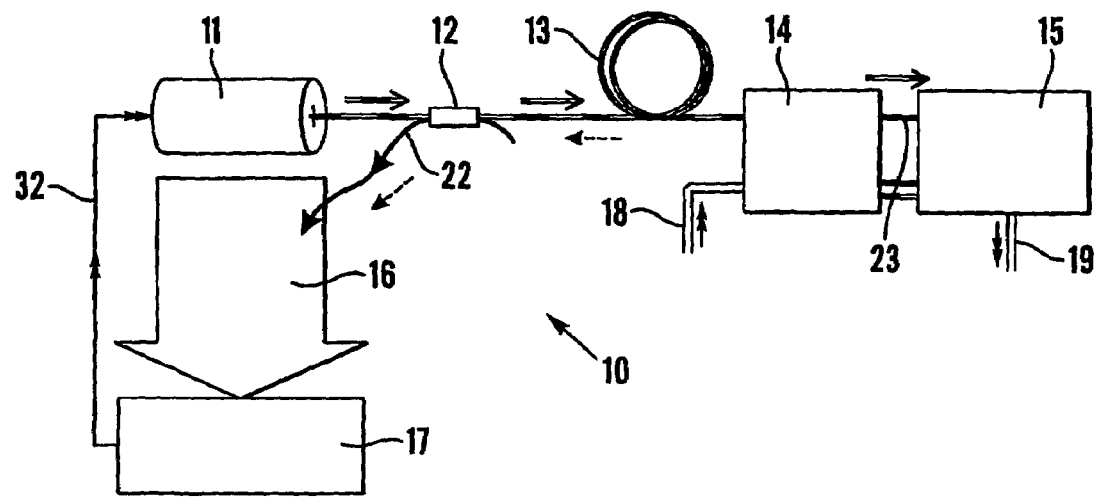
FIG. 1 shows an optically-powered hydraulic valve control system in accordance with a first embodiment of the present invention.

FIG. 1 shows a monitoring system 10 comprising an optical power source in the form of a laser 11 for generating light to operate a power-by-light (PBL) hydraulic valve arrangement 15. The valve is used to control flow-rate, flow direction and/or pressure in a hydraulic system. A high temperature grade, low numerical aperture (NA) multimode optical fibre 13 connects source 11 to integrated optical fibre based sensors 14 and, via a further optical fibre 23, to the valve 15 which incorporates a piezoelectric actuator. Hydraulic inlet and outlet ports are indicated schematically at 18 and 19 respectively.

The sensors 14 include a flow sensor and a temperature sensor and will be described in further detail below.

Figure 2:
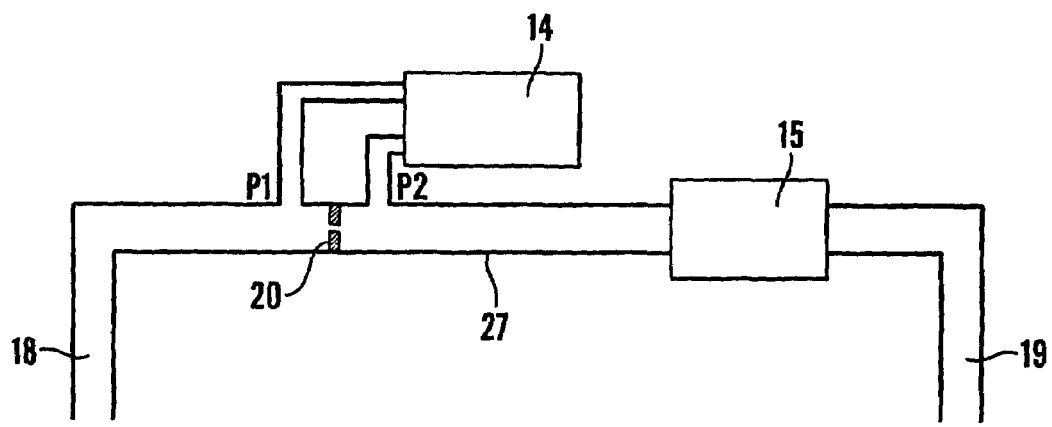
FIG. 2 shows the flow connections between components of FIG. 1.

FIG. 2 shows the hydraulic connections between the sensor arrangement 14 and the valve 15. It will be noted that the ports P1 and P2 of the sensor arrangement are in communication with the hydraulic passage 27 between inlet 18 and outlet 19. An orifice plate 20 is located in passage 27 between ports P1 and P2.

In one preferred arrangement a 150 mW laser source emitting an 810 nm peak wavelength uses a 50:50 multiple mode optical fibre coupler 12. One output end of the coupler is connected to multimode optical fibre Bragg gratings (mm-FBGs) which are used for differential pressure sensing and temperature sensing. The other end (at the input side) of the optical fibre coupler is connected to an optical spectrum analyser.

In another preferred arrangement the optical source 11 is an SLD 5 mW, L3302-01 laser from Hamamatsu emitting an 845 nm peak wavelength. The optical power is launched into a 50:50 single mode optical fibre coupler 12. Two output ends of the coupler are connected to optical fibre Bragg gratings (FBGS) which are used on a diaphragm means of the valve arrangement. Again, the other end (at the input side) of the optical fibre coupler is connected to an optical spectrum analyser (e.g. an Anritsu model MS99A, resolution 0.1 nm).

The optical fibre 13 is used to channel the sensing information from sensors 14 in the opposite direction to the power supplied by source 11. The information is channelled by fibre optic coupler or beam splitter 12 from the main optical fibre via a separate optical path 22 into an optical signal processor and monitoring unit 16. The unit 16 detects and converts the optical signal sent reflected from the sensors in the system to electronic information. The electrical information is then adapted and supplied to a further unit 17 including a signal processor, a control panel, a user interface and a display unit. The adapted information is supplied to a control panel display. A control link from unit 17 to the laser 11 is indicated by numeral 32.

Figure 3:
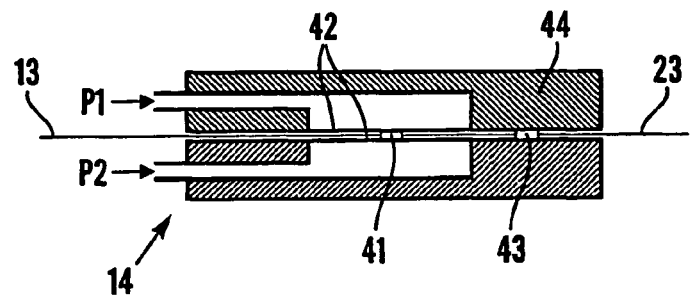
FIG. 3 shows a differential pressure flow sensor for use in systems according to the present invention.

The optical fibre sensors 14 are used for sensing the PBL valve operation and allow most of the optical power to pass through to the PBL valve or actuator 15. The sensors 14 comprise multimode fibre Bragg gratings (MM-FBGs) to sense the hydraulic flowrate, hydraulic pressure and fluid temperature in the hydraulic PBL valve system. In particular, one MM-FBG sensor 41 for strain is mounted between two diaphragms 42, FIG. 3, to sense the differential pressure proportional to flow-rate through the PBL valve 15. The second MM-FBG sensor 43 is incorporated as a temperature reference and compensates the differential pressure (DP) based flow sensor. The components are mounted in a housing 44. The sensor 43 is located so as not to be affected by movements of the diaphragms 42.

The temperature sensing MM-FBG, pressure sensing MM-FBG and PBL valve are connected in series through the same optical power transmission line 13, 23. Information regarding the fluid flowrate is reflected and returned up the same fibre waveguide 13 in the form of differential optical wavelength shifts. To detect the information, the unit 16 employs a wavelength demodulator to process the signals. The temperature information is also extracted. Wavelength division modulation (WDM) permits the strain and temperature signals to be extracted separately.

Figure 4:
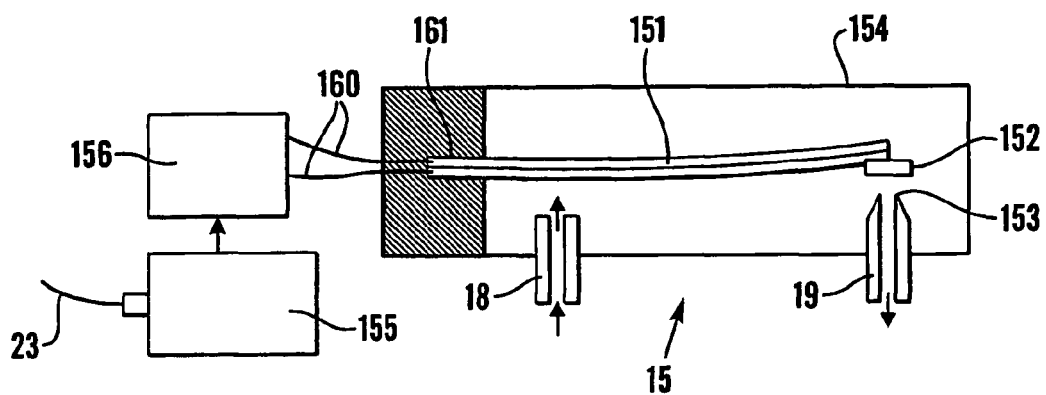
FIG. 4 shows a power-by-light hydraulic pilot valve arrangement for use in systems according to the present invention.

FIG. 4 shows an optical power valve arrangement 15 for hydraulic or pneumatic application, which is used to open and close a power-by-light valve. The arrangement comprises a piezoelectric multilayer or bimorph bender element 151, an elastomer blocking plate 152, an inlet nozzle 18, an outlet nozzle 19 and a valve case or housing 154. The valve is driven by electrical power, which is converted from optical power by a photovoltaic converter 155 and DC-DC converter 156. The optical power output from the sensor 14 is fed into the photo voltaic converter 155 to convert into electrical power to drive element 151 via electrical leads 160 which are connected to the fixed clamp end 161 of element 151.

A preferred hydraulic valve arrangement 15 has an operating pressure of greater than 950 kpa.

In the valve arrangement 15, the orifice plate 20, FIG. 2, is used to restrict the fluid flow and cause a pressure drop across itself. The thin plate diaphragms 42 are strained by applying this differential pressure to them. In an alternative arrangement, a single FBG 41 may be mounted on a single diaphragm 42, which is arranged such that the radial strain on the diaphragm surface is related to the applied pressure. The strain is transformed into optical information by using the optical fibre Bragg grating 41 mounted on the diaphragm (s) 42. The second grating 43 is for temperature measurement and temperature compensation. The differential wavelength shift between the reflected signals from the two gratings provides a measurement of the fluid flow-rate. Temperature variation causes the variation in the reflected wavelengths to be the same and therefore there is no change in differential wavelength (assuming perfect symmetry). Typical operating characteristics are a fluid flow-rate between 0–800 $cm^3/s$ at a pressure of 50 Bar and temperature range of $-4°$ C. to $160°$ C., preferably $25°$ C. to $75°$ C.

To manufacture preferred sensors, Bragg gratings are fabricated on multimode or single mode silica optical fibre. The output ends of each FBG sensor are connected directly to the valve to supply it with power.

The DP sensor is connected to the differential pressure across the orifice plate.

The above system is especially suitable for long transmission lines, typically about 5 km, thus permitting remote control of the valve 15. The use of wavelength modulation and demodulation is especially suitable for long distance applications. In addition, the system can resist harsh environments since the actuator in the valve is capable of operating in high temperatures. The actuator also has the advantage of relatively low power consumption.

The use of multimode fibre as the line 13 allows relatively high levels of power to be transmitted, over shorter distances, whereas single mode fibre is generally preferred for use over longer distances.

The system is self-contained in that the source 11 generates light to operate valve 15 and all the sensors in the system. The optical power attenuation associated with the sensors is small in comparison with the power passing through to actuate the valve 15. In particular, the sensors 14 pass the optical power directly to the valve 15 without any coupler or splitter between them. Thus, the need is eliminated for complicated and unreliable optical assemblies at the remote end, ie adjacent to valve 15.

The optical control loop utilises the same fibre for the majority of the transmission line where power and sensing signals travel in opposite directions. This control system can be operated without using optical fibre couplers or beam splitters at the remote end. Using a single fibre optic transmission line reduces costs, complexity, maintenance and allows easier fibre deployment.

Variation in optical power levels to the valve 15 can be used to vary the flow rate through the valve. Variation of flow rate through the valve 15 can be detected using this system. Power levels to the valve are controlled using pulse width modulation to the valve or by the power setting for continuous wave emission from the light source.

Various modifications can be made to the above-described arrangement. For example the optical source 11 may be an electrical light source or a semiconductor light source, white light, Light Emitting Diode (LED), Super Luminescent Diode (SLD), Edge-emitting LED (ELED), Laser Diode (LD) or Vertical Cavity Surface Emitting Laser Diode (VCSEL). The transmission line 13 may be multimode or single-mode optical fibres or other forms of optical waveguide. The same specification is used for the coupler/splitter 12 as for the optical fibre 13. Alternatively, the beam splitter or combiner 12 may be a cube glass beam splitter/combiner, angle glass, wavelength division multiplexing/demultiplexing (WDM/DWDM) coupler, silica-based buried channel waveguides coupler or optical couplers/splitters.

The actuator in the valve 15 may be piezoelectric, ferroelectric, electromagnetic, photostrictive, a shape memory alloy or electrostatic. The actuator utilises the extremely small amounts of power supplied to operate effectively.

The components of sensors 14 and actuator/valve 15 may be combined or separated as desired.

Instead of FBGs, sensors 14 may employ the techniques of microbending, Fabry-Perot sensing, or Rayleigh or Brillouin scattering.

The optical monitoring and processing unit may include an optical spectrum analyser, a CCD array grating, tuneable filter, a scanning filter, an optical interferometer, an optical wavelength edge detector and an optical power ratio detector. However, only a single detector may be provided.

The electronic processing can be microprocessor based or micro-controller based. Software can also be adapted for closed-loop feedback control of the light source 11.

Figure 5:
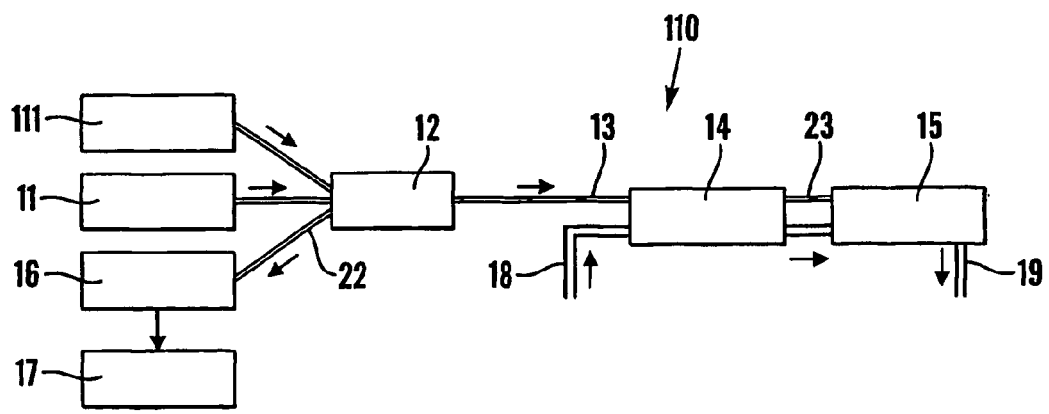
FIG. 5 shows an optically-powered actuator system in accordance with a second embodiment of the present invention.

The optically powered actuator system of FIG. 1 may be modified to employ more than one light source for distributed sensors. Thus FIG. 5 shows a monitoring system 110 with a laser source 11 and a wider bandwidth super luminescent diode 111 for the flow and temperature sensors. A 1×Z bidirectional fibre optic coupler 12 is employed.

The second optical source 111 can be used to monitor when the optical fibre is broken. The laser source 11 is interlocked with the second source monitoring arrangement so that the laser is turned off for safety reasons if a broken fibre is detected.

Again, the optical fibre 13 in the system can utilise either multimode or single mode optical fibre. A multimode fibre is the most suitable for the short distance system (<5 km), because it is easy to couple to optical sources and inexpensive components. A single mode optical fibre is preferred when the system distance is over 5 km, because the single mode fibre has a very low attenuation compared to the multimode fibre.

Also, as in the embodiment of FIG. 1, an optical fibre based flow sensor or flow switch 14 of FIG. 5 employs wavelength-based modulation and it allows the optical power to pass into the actuator unit of valve 15. For example, a differential pressure flow sensor 14 can use an optical fibre Bragg grating in either single mode or multimode.

The optical signals from both light sources 11, 111 are transmitted into the sensor 14. The laser power passing through the FBG sensors 14 into the actuator and the optical power from second light source 111 is reflected back by the FBGs. The reflected signal from the FBGs is wavelength modulated and is transmitted along the same optical fibre 13 and is fed into signal monitoring unit 16 and processor unit 17. Whereas prior art techniques, such as that disclosed in U.S. Pat. No. 5,848,204 use multimode FBGs in extrinsic mode for strain measurement based upon microbending and mode losses, the present technique is based upon intrinsic multimode FBGs, which offer simpler design, lower cost and better performance. Use in the "extrinsic" mode means use for reflection only, whereas use in the "intrinsic" mode means use for sensing in addition to reflection.

Figure 6:
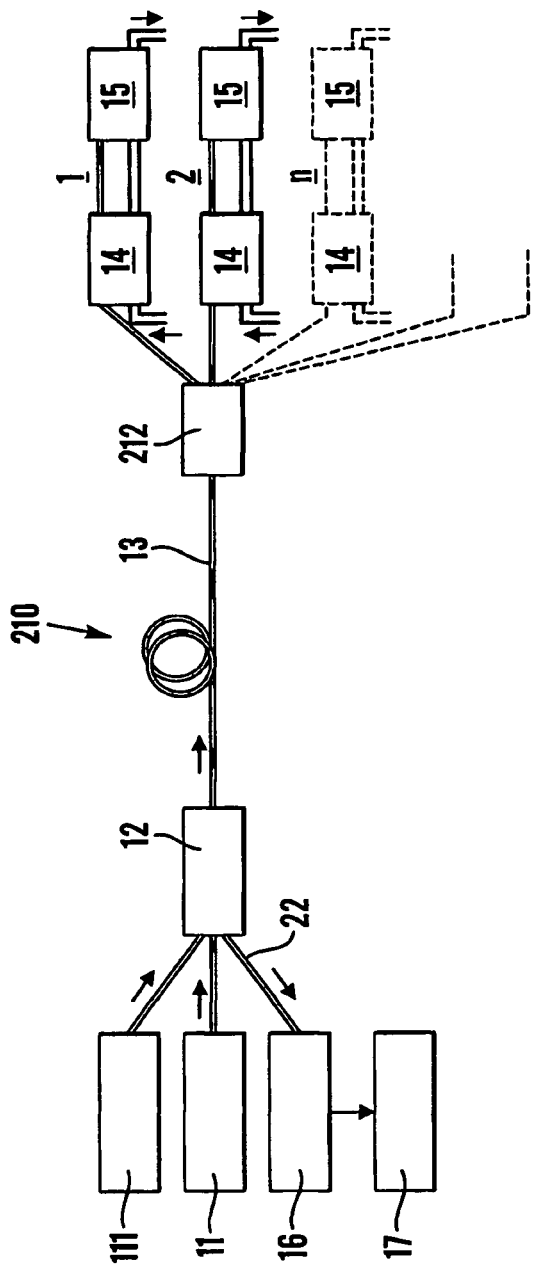
FIG. 6 shows a modification of the system of FIG. 5.

FIG. 6 shows a modified monitoring system 210 in which, by using an optical coupler 212, the actuator arrangement may comprise a multiplexed plurality of sensor/valve combinations 14, 15.

Figure 7:
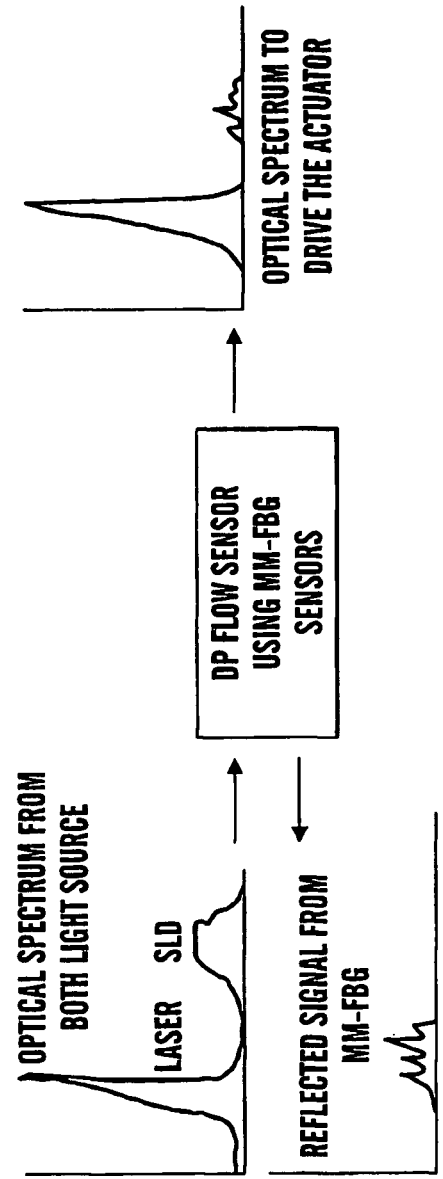
FIG. 7 shows optical spectra relating to the system of FIG. 5.

FIG. 7 indicates the spectra of the input and output signals to and from the sensors 14. With a flow passing through the orifice plate 20, a differential pressure is produced and the MM-FBG 41 located between the diaphragms 42 is strained. The FBG reflected signal wavelength is shifted proportional to the applied strain. The amount of wavelength shift is related to the applied pressure and flow rate and can be monitored and processed by units 16 and 17.

Various monitoring schemes can be used by the optical signal processor and monitoring unit 16 and 17. The signal processing scheme in unit 17 could be: using the centroid of the MM-FBG spectra, fuzzy logic, artificial neural networks, and/or correlation. For example, auto-correlation and cross-correlation can be used to analyse the data from the MM-FBG 41 and they can be completed in less than 1 second. The cross-correlation, $r_{12}(n)$ between two data sequences, each containing N data points, can be written as:

$$r_{12}(n) = \frac{1}{N}\sum_{n=0}^{N-1} x_1(n)x_2(n)$$

where $x_1(n)$ is the first data sequence and $x_2(n)$ the second data sequence.

Figure 8:
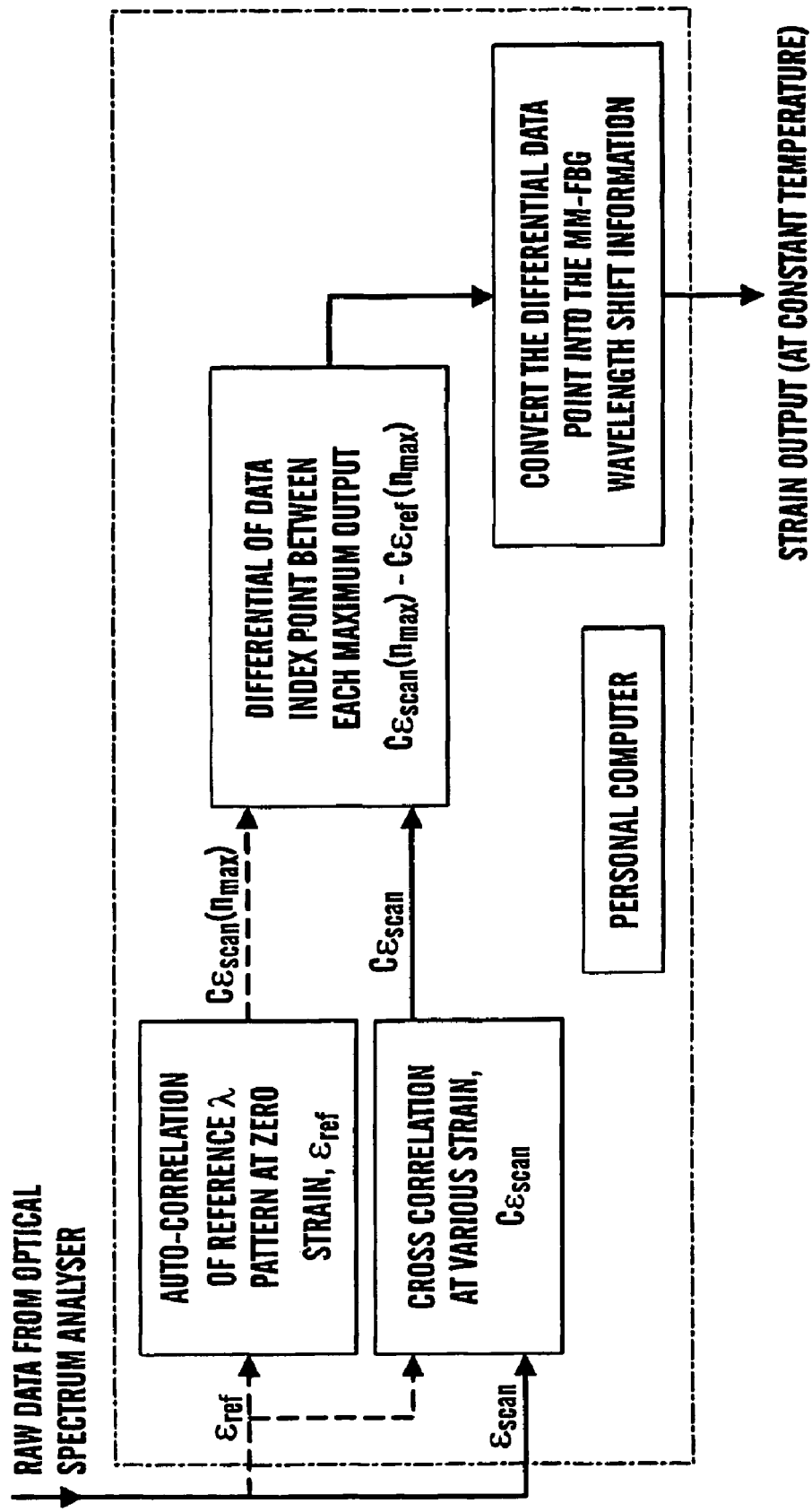
FIG. 8 shows a strain signal processing scheme block diagram relating to the system of FIG. 5.

For the strain measurement the MM-FBG spectra (scanned by an optical spectrum analyser) at zero strain are used to provide a reference pattern $\epsilon_{ref}$. The raw reference data is stored in a computer memory and is processed by the auto-correlation method. The output from the auto-correlation is used as the correlation strain reference $C\epsilon_{ref}$, and this is also saved in computer memory. The new scanning data is processed again after the strain has been varied. The applied strain scanning data $\epsilon_{scan}$ is compared with the correlation strain reference $C\epsilon_{ref}$. The distance between maximum points of each result, $C\epsilon_{scan}(n_{max})-C\epsilon_{ref}(n_{max})$ (where $n_{max}$ is the data index point at maximum value of a correlation result), can be converted into MM-FBG wavelength shift information. A signal processing block diagram is shown in FIG. 8.

Figure 9A:
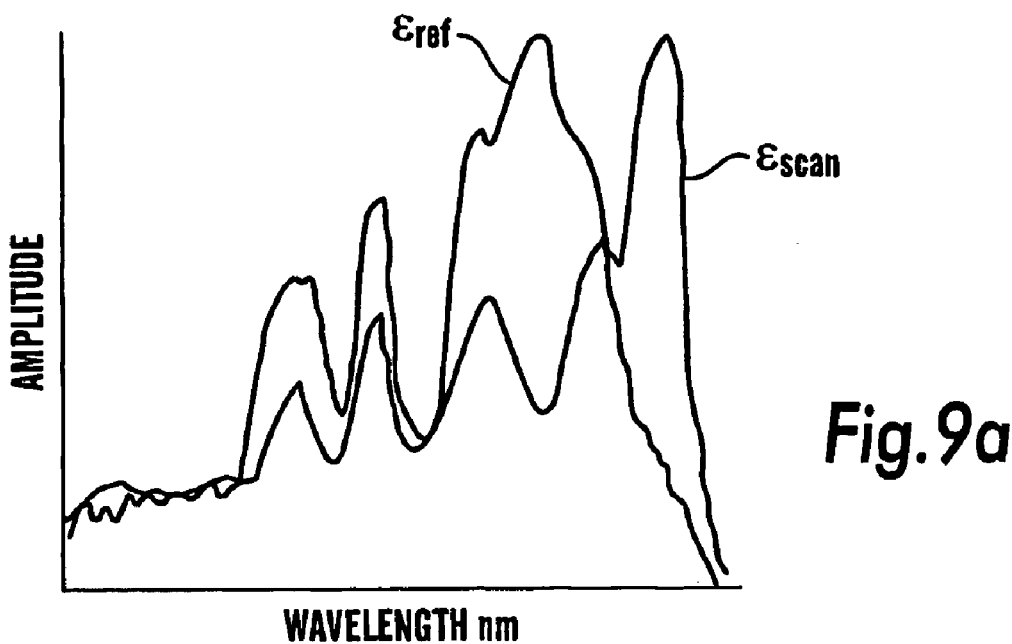
FIG. 9 show signal waveforms relating to FIG. 8, with FIG. 9a representing raw reference data and raw scanning data, and FIG. 9b representing a correlation output.
Figure 9B:
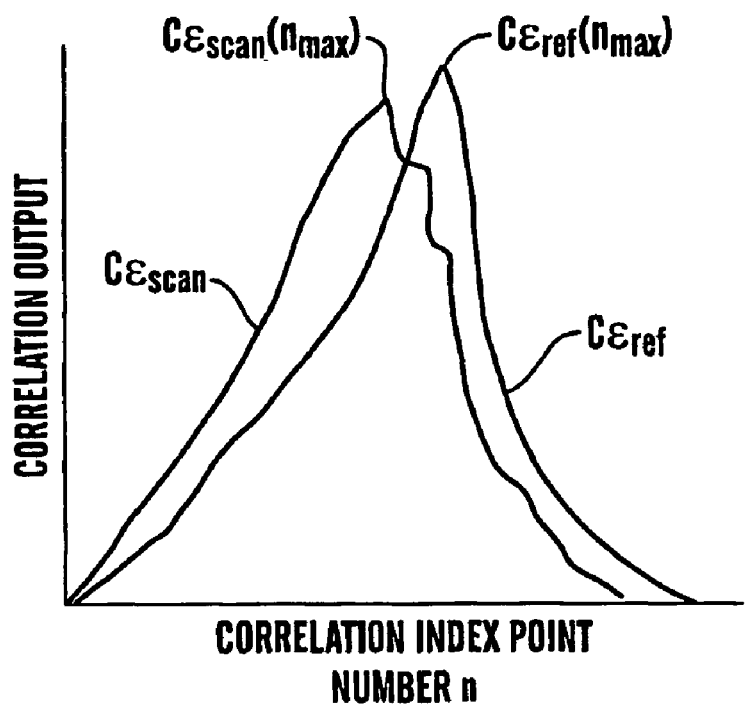

As can be seen in FIG. 9, the reference signal is scanned and saved in the PC memory and then the raw signal is measured (FIG. 9a). In order to establish the amount of wavelength shift, correlation signal processing (FIG. 9b) is used to evaluate the maximum correlation points between reference and measured signals. The difference of the position of the highest peaks form the two output signals obtained from the correlation process is then converted back to wavelength shift of reflection spectra.

The features and modifications of the embodiments of FIGS. 1 and 5 may be interchanged as desired. The second source 111 may be any of the types of light source given above.

The arrangement disclosed in FIG. 5 allows the use of two sensors in series and greater sensitivity. The use of more than one light sources increases the optical bandwidth and hence improves the resolution of the or each sensor or allows an increase in the number of sensors used, or both increases resolution and the number of sensors that can be used.

The use of a 1×Z coupler 12 (with Z greater than or equal to 3) allows greater sensitivity, use of more sensors and/or interlock within a single control system. The use of a 1×Z coupler also allows the use of many actuators and/or valves at the remote end (15).

Instead of a hydraulic valve, the above-described systems can be used in conjunction with a wide range of control elements in pneumatic, gas powered or other control systems. Typical applications include the aircraft, petrochemical, oil and gas exploration industries and use in fuel system applications. The advantages of arrangements according to the present invention in these contexts include intrinsic safety in hazardous environments, low attenuation, immunity from electromagnetic interference, cable weight and ease of deployment. Moreover, arrangements according to the present invention provide feedback-sensing information using the same optical power transmission fibre without using any coupler or beam splitter at the remote harsh environment end.

Instead of being both powered and controlled optically, the actuator may be powered or controlled optically with the other function being effected in some other way, e.g. electrically, by electromagnetic induction, radio waves etc.

The term "optical" as used herein embraces infra-red, ultra-violet and other non-visible electromagnetic wavelengths.

The invention claimed is:

1. A monitoring system for an optically powered and/or controlled hydraulic or pneumatic valve arrangement comprising an optical path arranged to be connected between at least one optical source and the hydraulic or pneumatic valve arrangement for supplying power and/or control information to the hydraulic or pneumatic valve arrangement, the hydraulic or pneumatic valve arrangement including an optical power convener and/or an optical control information converter, wherein the hydraulic or pneumatic valve arrangement further comprises an optical fibre sensor for sensing the operation of the hydraulic or pneumatic valve arrangement and providing an optical data output back through said optical path, and wherein a monitoring device is connected to the optical path to monitor the output of said optical fibre sensor.

2. A monitoring system according to claim 1, wherein the optical power converter and/or the optical information converter is also operated by the optical source.

3. A monitoring system according to claim 1, wherein the optical power converter and/or the optical information converter comprises one or more fibre Bragg gratings.

4. A monitoring system according to claim 3, wherein a differential pressure of the hydraulic or pneumatic valve arrangement is sensed by an arrangement incorporating a fibre Bragg grating located adjacent to at least one diaphragm.

5. A monitoring system according to claim 4, wherein the fibre Bragg grating is mounted between two diaphragms arranged to be exposed to different pressures.

6. A monitoring system according to claim 3, wherein at least one fibre Bragg grating is provided for sensing a temperature of the hydraulic or pneumatic valve arrangement.

7. A monitoring system according to claim 1, further comprising at least two optical sources, a first of which is used for supplying power and/or control information, and a second of which is used to detect interruption of the optical path and is arranged to turn off the first source in the event of such interruption.

8. A monitoring system according to claim 7, wherein the first optical source is a laser.

9. A monitoring system according to claim 1, wherein the monitoring device includes an optical spectrum analyser.

10. A monitoring system according to claim 1, further comprising an optical coupler or beam splitter located in the optical path.

11. A monitoring system according to claim 1, wherein the output of the sources is controlled by a signal from the monitoring device.

12. A monitoring system according to claim 1, wherein the hydraulic or pneumatic valve arrangement is at a location remote from the optical source.

13. A monitoring system according to claim 1, wherein the hydraulic or pneumatic valve arrangement is multiplexed.

14. A monitoring system for an optically powered and/or controlled actuator arrangement comprising an optical path arranged to be connected between at least one optical source and the actuator arrangement for supplying power and/or control information to the actuator arrangement, the actuator arrangement including an optical power converter and/or an optical control information converter, wherein the actuator arrangement further comprises a sensor for sensing the operation of the actuator arrangement and providing an optical data output back through said optical path, wherein a monitoring device is connected to the optical path to monitor the output of said sensor, and wherein a differential pressure of the actuator arrangement is sensed by an arrangement incorporating a fibre Bragg grating located adjacent to at least one diaphragm.

15. A monitoring system according to claim 14, wherein the fibre Bragg grating is mounted between two diaphragms arranged to be exposed to different pressures.

16. A monitoring system for an optically powered and/or controlled actuator arrangement comprising an optical path arranged to be connected between at least one optical source and the actuator arrangement for supplying power and/or control information to the actuator arrangement, the actuator arrangement including an optical power converter and/or an optical control information converter, wherein the actuator arrangement further comprises a sensor for sensing the operation of the actuator arrangement and providing an optical data output back through said optical path, wherein a monitoring device is connected to the optical path to monitor the output of said sensor, and wherein the system further comprises at least two optical sources, a first of which is used for supplying power and/or control information, and a second of which is used to detect interruption of the optical path and is arranged to turn off the first source in the event of such interruption.

17. A monitoring system according to claim 16, wherein the first optical source is a laser.

* * * * *